United States Patent [19]

Wignall et al.

[11] Patent Number: 4,540,530

[45] Date of Patent: Sep. 10, 1985

[54] HUMIDIFIER PAD

[75] Inventors: Robert A. Wignall, Victoria Harbour; Samuel Travale, Stoney Creek, both of Canada

[73] Assignee: B. D. Wait Co. Limited, Oakville, Canada

[21] Appl. No.: 693,304

[22] Filed: Jan. 23, 1985

Related U.S. Application Data

[63] Continuation of Ser. No. 459,843, Feb. 21, 1983, abandoned.

[30] Foreign Application Priority Data

Oct. 12, 1982 [CA] Canada ................................ 413241

[51] Int. Cl.⁴ ................................................ B01F 3/04
[52] U.S. Cl. ........................................ 261/92; 126/113; 248/603; 248/604; 261/DIG. 15; 261/DIG. 41; 264/146; 428/36
[58] Field of Search ........ 261/92, DIG. 15, DIG. 72, 261/DIG. 41; 126/113; 264/146; 428/36, 136; 55/400, 492, 498, 510, 529, 231, 232, 234; 248/603, 604

[56] References Cited

U.S. PATENT DOCUMENTS

| | | | |
|---|---|---|---|
| 2,173,645 | 9/1939 | Bordner | 261/92 X |
| 2,646,796 | 7/1953 | Scholl | 428/36 X |
| 3,171,820 | 3/1965 | Volz | 261/DIG. 72 |
| 3,640,515 | 2/1972 | Stiles | 261/92 |
| 3,834,680 | 9/1974 | Yost et al. | 261/92 |
| 3,895,083 | 7/1975 | Yeagle | 261/92 |
| 4,139,159 | 2/1979 | Inoue et al. | 428/36 X |
| 4,184,946 | 1/1980 | Kato | 261/92 X |

*Primary Examiner*—Richard L. Chiesa
*Attorney, Agent, or Firm*—Hirons, Rogers & Scott

[57] ABSTRACT

A humidifier pad for use in humidifiers suitable for adding moisture to the air circulated by a forced air furnace is described together with its method of manufacture. A slab of open-cell foam is stamped using a reciprocating cutter to form humidifier pads which are seamless. These seamless pads are adapted to be fitted onto the cylindrical support frame of the humidifier and the pad is especially useful in a combination with a type of frame which is collapsible cylindrical and which facilitates removal and replacement of the pad.

3 Claims, 6 Drawing Figures

HUMIDIFIER PAD

This application is a continuation of my earlier application Ser. No. 459,843, filed Feb. 21, 1983, now abandoned.

The present invention relates to humidifiers suitable for adding moisture to the air circulated by a forced air furnace, and more particularly to a humidifier pad and method of manufacture of such a pad for use in these humidifiers.

It is well known to heat a house using a so-called "forced air system". Such a system heats air within a furnace and circulates it through the rooms of the house by way of a network of ducts. As the air is circulated it gives up moisture on windows and other cold places, and new air inspired from outside has, in general, a lower relative humidity than that in the house when the new air reaches ambient temperature. It has therefore become a common practice to add moisture to the air circulated by the furnace to increase the humidity within the house.

Moisture is commonly added to the forced air by diverting some of the high pressure hot air delivered by the furnace through an evaporator and into the low pressure return duct of the furnace. The evaporator conventionally comprises a cylindrical frame with its axis horizontal and which is covered by an open-cell pad of foamed synthetic plastic material and a water tray in which the lower part of the pad is immersed. The frame and pad are made to rotate slowly so that as hot air is blown over the surface of the pad, water is evaporated thereby increasing the humidity of the air being returned to the furnace.

Such humidifier pads are conventionally made by folding a strip of open-cell synthetic foam material about its length to form an annulus and then stitching and/or gluing the ends of the annulus to form a substantially cylindrical pad. This pad is then fitted over the cylindrical frame. One problem with such methods of manufacture is that they are both time-consuming and labour intensive requiring considerable dexterity to secure the ends of the annulus together. In addition, with such humidifier pads it has become necessary in practice to supply a net which fits over the pad in situ both to retain the pad in its cylindrical form and more importantly to prevent the pad jamming the float of the humidifier open and causing flooding should be stitches or the adhesive break at the joint. The need for the net adds to the cost and complexity of the pad.

An object of the present invention is to obviate or mitigate the disadvantages associated with the method of manufacture of such humidifier pads and with such humidifier pads per se.

Accordingly in a first aspect of the present invention there is provided a seamless humidifier pad comprising a slab of open-cell synthetic plastic material having rounded ends, parallel sides blending into the rounded ends, and defining a slit extending through the slab parallel to the sides and terminating short of the rounded ends whereby upon deforming the pad into a generally cylindrical annular sleeve, the pad exhibits a substantially uniform wall thickness.

Preferably, each of the rounded ends in cross-section comprises a first portion aligned with the slit and being of smaller radius and two portions blending the first portion into the respective sides and being of larger radius.

Preferably also the centre of the smaller radius falls geometrically inwardly of the nearer end of the slit and coincident with the slit.

In a second of its aspect the present invention provides a method of manufacturing a humidifier pad of predetermined wall thickness from a slab of open-cell synthetic plastic material, having two parallel sides spaced apart by twice the wall thickness. According to the method, a pad is cut from the slab after first placing the slab in position with the sides parallel to the line of action of a cutter while supporting these sides against outward deformation. The cutter engages the slab to remove end pieces from the slab leaving rounded ends and to slit the material parallel to the sides and short of the rounded ends to form the pad whereby upon deforming the pad into a generally cylindrical annular sleeve, the pad exhibits a substantially uniform wall thickness.

Preferably, several humidifier pads are formed simultaneously from a single slab.

The invention will be better understood with reference to the following description taken in combination with the accompanying drawings, in which.

Figure 1:
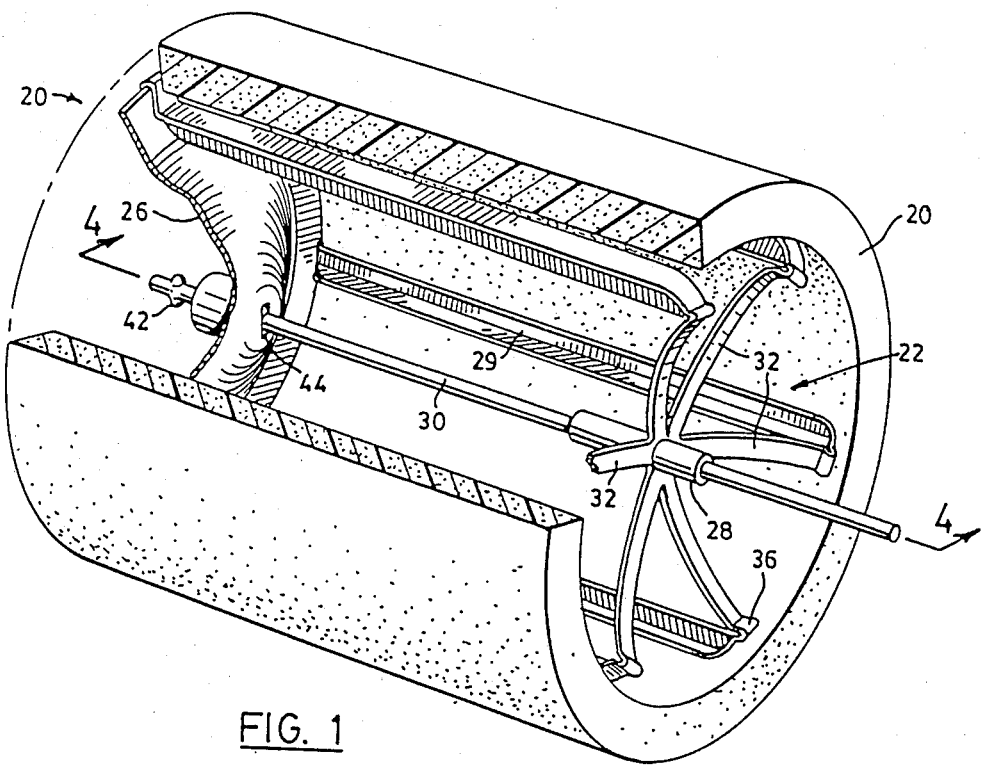
FIG. 1 is a perspective view with parts broken away to show a preferred embodiment of a humidifier pad according to the invention mounted on a generally cylindrical pad support for use in a humidifier of the type used in forced air heating systems.

Reference is first made to FIG. 1 which illustrates an annular humidifier pad 20 according to a preferred embodiment of the invention mounted on a pad support 22 which has a generally cylindrical form for rotation in a humidifier of the type used in forced air heating systems. The pad support is of a particularly advantageous type for use with humidifier pads such as the pad 20 and details of its structure will be described with reference to FIGS. 4 and 5. For the moment, it will be seen that the pad 20 is positioned so that air blowing over the pad and inside the annular pad can remove moisture which is carried by the pad as it rotates through a water tray in a conventional manner. In order to carry water in this way, the pad is of a flexible, open-cell polyurethane foam and is a close fit on the pad support to resist the tendency for the weight of water to deform the pad.

Figure 2:
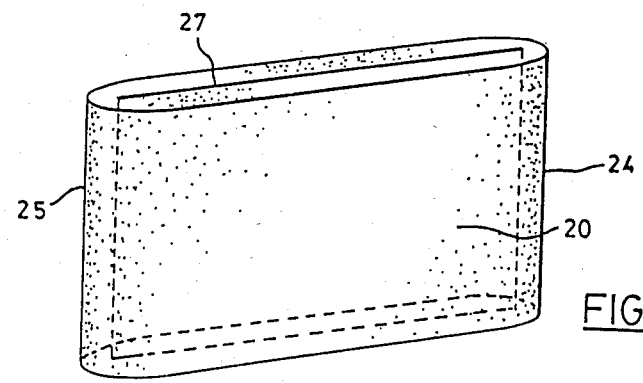
FIG. 2 is a perspective view of the humidifier pad in the shape it assumes after manufacture.
Figure 3:
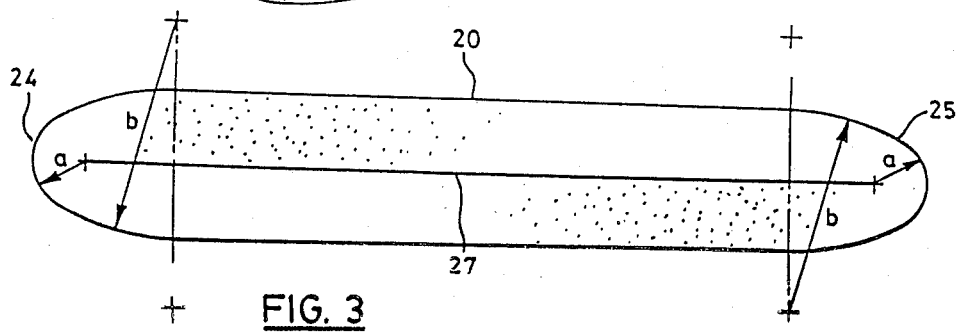
FIG. 3 is an end view of the humidifier pad.

The shape of the pad prior to assembly on the support is best seen in FIG. 2. Prior to assembly the pad is flat and the continuous wall of the pad is formed by rounding the ends 24, 25 and creating a slit 27 through the pad between the ends. The form of these ends in relation to the slit and thickness of the pad is better seen in FIG. 3. For a typical pad, the overall thickness is 2 inches with the slit located centrally (i.e. one inch in from each side). The ends are rounded using a radius "a" which is about 0.625 inch. This radius blends into a larger radius "b" centered on a line 1.875 inches from the end of the pad and having a radius of 3.041 inches. Again, this radius blends into the side wall of the pad so that the end has a continuously curved surface. The slit ends at a distance 0.5625 inches from the end of the pad, i.e. 0.125 inch outwardly from the centre of radius of the end of the pad. These dimensions are chosen to fit the most commonly used pad supports but of course can be varied for different pad supports. They provide for the ends of the pad to deform as the pad is placed on the support without excessive deformation of the pad so that in use the pad appears continuous and seamless without any major collapsing of the cell structure where the ends of the pad were located in manufacture.

Figure 4:
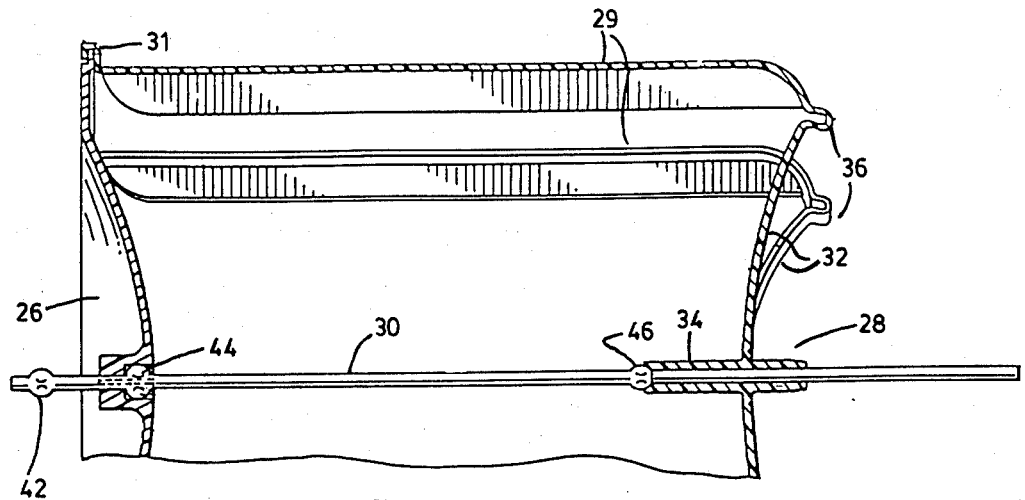
FIG. 4 is a partial sectional view on line 4—4 of FIG. 1 showing the pad support in its normal position ready for use.
Figure 5:
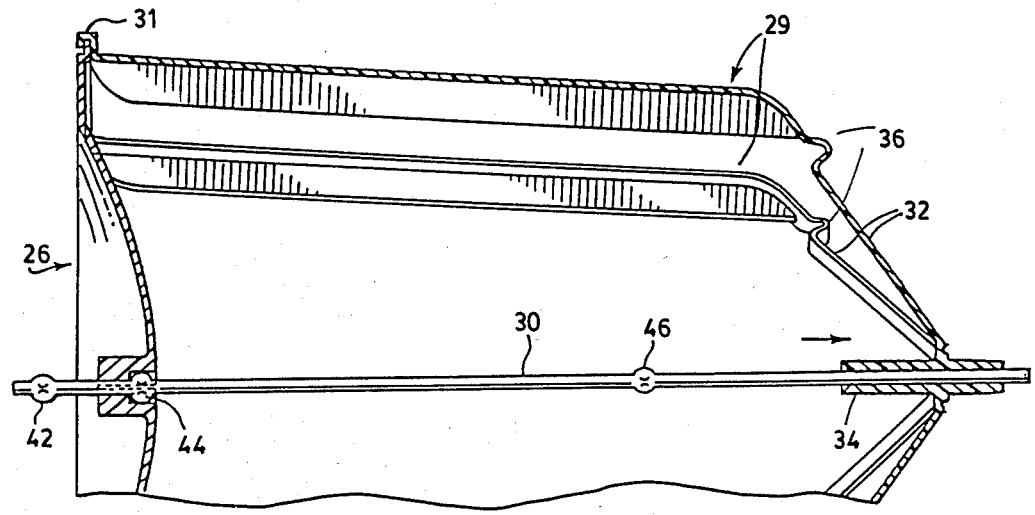
FIG. 5 is a view similar to FIG. 4 showing the pad support in a collapsed condition to permit replacement of a humidifier pad.

Reference is made to FIG. 1 with further reference to FIG. 4 to describe the pad support 22. As seen in these figures, the support consists of a fixed end 26 and a movable end 28 connected to one another by stringers 29 extending parallel with an axle 30. The stringers have a generally T-shaped cross-section and are attached to the fixed end 26 at connectors 31. At their other ends, the stringers are attached integrally to radial spokes 32 which are connected at their inner ends to a hub 34. Spokes 32 meet the stringers 29 at U-shaped portions 36 which are effectively extensions of the spokes formed to provide a portion of reduced cross-section which will permit angular movement between the spokes and stringers. Further, because of the strap-like shape of the spokes, they are capable of deflection into a curved position shown in FIG. 4 and they are retained in this position by the development of hoop stress in the pad which is normally carried on the support as shown in FIG. 1. There is therefore an over-centre effect providing a locking action to retain the support in the FIG. 4 position in use.

It will be seen from FIG. 4 that the axle 30 includes a pair of ears 42 at a drive end and a further pair 44 engaged in a boss on the fixed end 26 to drive the support in use. Towards the other end, a pair of ears 46 are provided to act as a stop for the boss 34 in the position assumed when carrying a pad and the boss 34 can be moved outwardly as demonstrated in FIG. 5 into a position where the stresses in the radial spokes have been relieved and the stringers 29 have moved into an angular or convergent position to provide clearance for removing or replacing the humidifier pad 20 (FIG. 1).

Various embodiments of the humidifier pad fall within the scope of the invention. For instance the foam material used may be any suitable flexible open-cell synthetic foam such as polyurethane, cross-linked and polyester foams. These suitable foams typically have a pore size varying from 8 pores to 27 pores per inch. However preferred pore sizes fall in the range 15–25 pores per inch with the optimum being 20 pores per inch.

Figure 6:
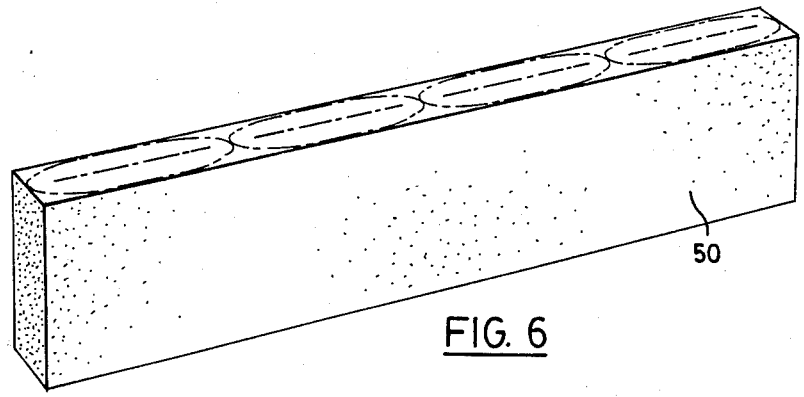
FIG. 6 is a perspective view of a slab of synthetic plastic material about to be cut into four humidifier pads according to a preferred method of manufacture of the humidifier pad.

Reference is next made to FIG. 6 to demonstrate a suitable method of manufacturing a humidifier pad described previously. A slab of foamed plastic material 50 is cut from a larger slab with a thickness equal to the desired thickness of the pad as it appears in FIG. 2. The slab is supported between pairs of guide walls of the sides and ends and a cutter is brought down to engage the slab from the top (as drawn) to cut along the lines indicated in ghost outline. It will be seen that there is a minimum loss of material and that four pads result from a single cut. Evidently many more pads could be made from a longer slab using a single cut but it has been found convenient to handle a slab of a material from which four pads can be made at once.

It should be understood that several modifications and alternative arrangements may be made to the apparatus as hereinbefore described without departing from the scope of the invention.

Also it will be appreciated that a humidifier pad has been described with reference to specific aspects of its manufacture and construction which simplifies both the maintenance and the safety aspects of the humidifier. Furthermore, the novel humidifier pad offers advantages in installation, particularly with the use of the collapsible frame with reference to other prior art arrangements.

We claim:

1. A seamless humidifier pad of formed synthetic plastic material, the pad comprising:
    a pair of similar side walls having rectangular shape and having inwardly facing surfaces in contact with one another across the entire surface; and
    a pair of rounded ends, each of the ends blending into and connecting opposite ends of the side walls to one another, the thickness of each of the rounded ends being a maximum at the junctions with the side walls and a minimum in a plane containing said surfaces, whereby upon deforming the pad by stretching the pad onto a cylindrical support, the pad exhibits a substantially uniform cylindrical outer surface.

2. The combination of a seamless humidifier pad as claimed in claim 1 and a cylindrical support for receiving the pad to mount the pad in a humidifier to rotate the pad and support the pad in an air stream to humidify the air stream.

3. In combination, the combination as claimed in claim 2 and a humidifier, the humidifier having means mounting the support for rotation, drive means to drive the support about a longitudinal axis of the support, a tray for containing water in which a portion of the pad is to be immersed, and a valve to maintain a predetermined water level in the tray.

* * * * *